US009643230B2

(12) United States Patent
Andrews et al.

(10) Patent No.: US 9,643,230 B2
(45) Date of Patent: May 9, 2017

(54) GROUNDING SPACER

(71) Applicant: A.K. STAMPING COMPANY, INC., Mountainside, NJ (US)

(72) Inventors: Mark Andrews, Wharton, NJ (US); Arthur Kurz, New Vernon, NJ (US)

(73) Assignee: A.K. Stamping Company, Inc., Mountainside, NJ (US)

( * ) Notice: Subject to any disclaimer, the term of this patent is extended or adjusted under 35 U.S.C. 154(b) by 0 days.

(21) Appl. No.: 14/209,299

(22) Filed: Mar. 13, 2014

(65) Prior Publication Data
US 2014/0261640 A1  Sep. 18, 2014

Related U.S. Application Data

(60) Provisional application No. 61/784,847, filed on Mar. 14, 2013.

(51) Int. Cl.
| | | |
|---|---|---|
| *B21D 22/02* | (2006.01) | |
| *B21D 22/00* | (2006.01) | |
| *H02S 30/10* | (2014.01) | |
| *H01R 4/42* | (2006.01) | |
| *H01R 4/62* | (2006.01) | |
| *B21D 28/30* | (2006.01) | |
| *H01R 4/26* | (2006.01) | |
| *H01R 4/64* | (2006.01) | |

(52) U.S. Cl.
CPC ............ *B21D 22/00* (2013.01); *B21D 22/02* (2013.01); *H01R 4/42* (2013.01); *H01R 4/62* (2013.01); *H02S 30/10* (2014.12); *B21D 28/30* (2013.01); *H01R 4/26* (2013.01); *H01R 4/64* (2013.01)

(58) Field of Classification Search
CPC ...... B21D 22/02; B21D 28/26; B21D 28/265; B21D 28/30; B21D 28/10; B21D 28/24; B21D 31/02; B21D 53/02; B21D 53/22; H01R 4/26; F16B 39/24; F16B 43/001
USPC ..................... 72/327, 332, 333; 439/108
See application file for complete search history.

(56) References Cited

U.S. PATENT DOCUMENTS

| | | | | |
|---|---|---|---|---|
| 1,099,027 | A * | 6/1914 | Crozier .................. | F16B 39/24 411/162 |
| 1,807,258 | A * | 5/1931 | Schwartz ............... | B21D 53/20 411/162 |
| 2,034,258 | A * | 3/1936 | Hausser .................. | F16B 39/24 411/162 |
| 2,069,402 | A * | 2/1937 | Cowlin .................. | F16B 39/24 411/147 |
| 2,179,575 | A * | 11/1939 | Hosking ................. | F16B 39/24 411/162 |
| 2,191,101 | A * | 2/1940 | Stellin .................... | F16B 39/24 411/147 |
| 2,250,280 | A * | 7/1941 | Starbird ................. | H01R 4/26 174/140 R |
| 2,281,822 | A * | 5/1942 | Bills ....................... | E04C 2/427 52/180 |

(Continued)

*Primary Examiner* — Edward Tolan
(74) *Attorney, Agent, or Firm* — McCarter & English, LLP

(57) ABSTRACT

A grounding spacer is provided. The grounding spacer comprising a circular body having a top surface, a bottom surface, and a central aperture, and a plurality of radially spaced penetration features, wherein at least one of the penetration features has at least a portion thereof extending from the top surface, and wherein at least one of the penetration features has at least a portion thereof extending from the bottom surface.

9 Claims, 5 Drawing Sheets

(56) References Cited

U.S. PATENT DOCUMENTS

| | | | | |
|---|---|---|---|---|
| 2,994,123 | A * | 8/1961 | Kritzer | 29/890.047 |
| 3,181,440 | A * | 5/1965 | Mullaney et al. | 105/457 |
| 3,286,551 | A * | 11/1966 | Tipton | B02C 18/36 |
| | | | | 241/82.5 |
| 3,340,494 | A | 9/1967 | Gutshall | |
| 3,442,110 | A * | 5/1969 | Hogan | B21D 22/04 |
| | | | | 29/894.325 |
| 3,481,381 | A * | 12/1969 | Black | F16B 39/24 |
| | | | | 411/162 |
| 3,569,915 | A * | 3/1971 | Sorensen et al. | 439/607.12 |
| 4,150,556 | A * | 4/1979 | Melnyk | 72/333 |
| 4,440,463 | A * | 4/1984 | Gliha et al. | 439/92 |
| 4,614,105 | A * | 9/1986 | Hisao | B21D 5/02 |
| | | | | 29/727 |
| 4,704,058 | A | 11/1987 | Crunwell | |
| 4,900,209 | A | 2/1990 | Reynolds | |
| 4,900,259 | A * | 2/1990 | Ludwig et al. | 439/107 |
| 5,078,613 | A * | 1/1992 | Salmon | H01R 4/64 |
| | | | | 174/94 S |
| 5,236,272 | A | 8/1993 | Hibbard | |
| 5,257,949 | A * | 11/1993 | Paulus | 439/620.1 |
| 5,470,183 | A * | 11/1995 | Swick | H01R 4/44 |
| | | | | 411/160 |
| 5,538,077 | A * | 7/1996 | So | F28D 9/0043 |
| | | | | 165/109.1 |
| 5,927,137 | A | 7/1999 | Sinteff | |
| 8,092,129 | B2 | 1/2012 | Wiley et al. | |
| 8,353,650 | B2 | 1/2013 | Wiley et al. | |
| 9,091,461 | B2 * | 7/2015 | O'Brien | F24J 2/5237 |
| 2004/0205966 | A1 * | 10/2004 | Ohishi | 29/889.2 |
| 2007/0248434 | A1 | 10/2007 | Wiley et al. | |
| 2008/0314818 | A1 * | 12/2008 | Tonami et al. | 210/348 |

\* cited by examiner

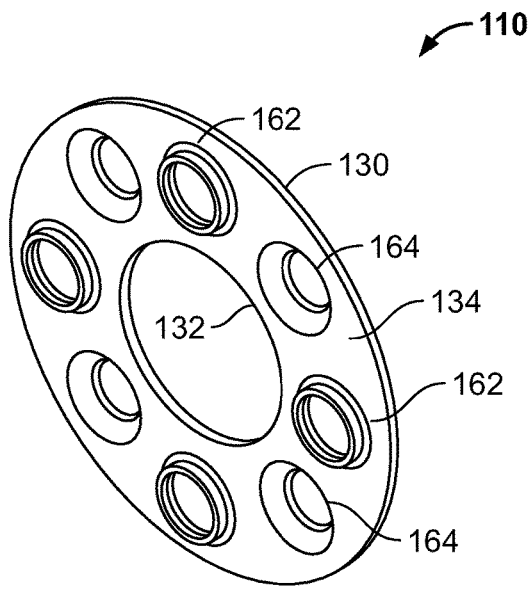
FIG. 3
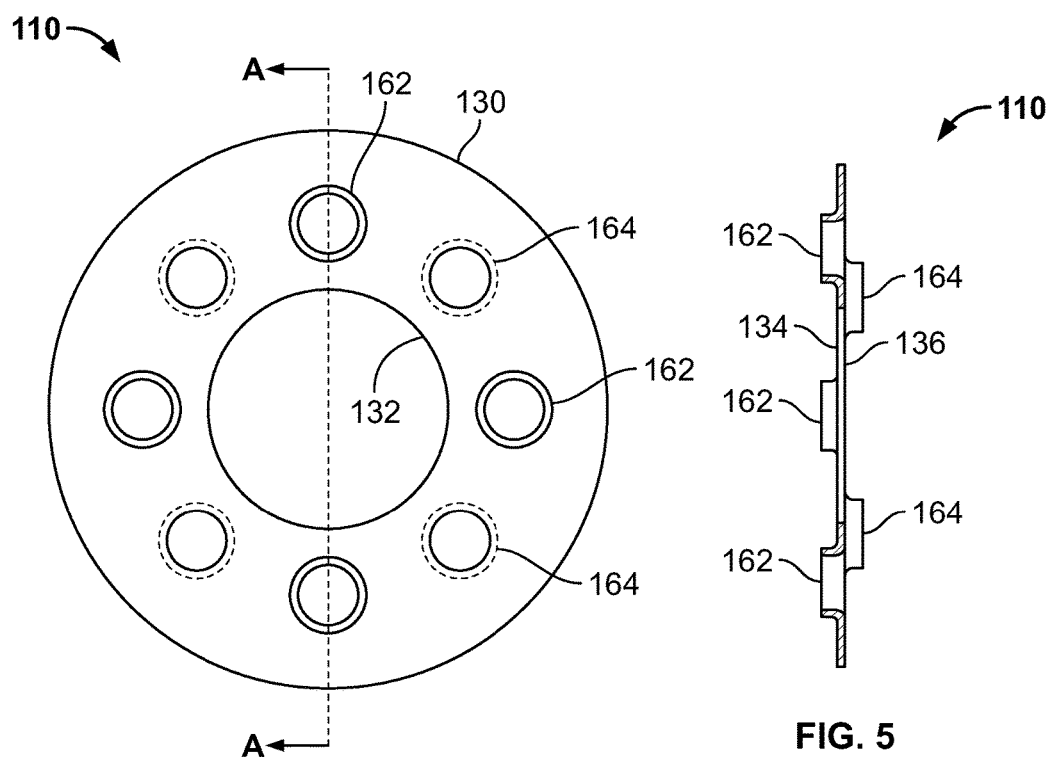
FIG. 4
FIG. 5

GROUNDING SPACER

CROSS-REFERENCE TO RELATED APPLICATION

This application claims priority to U.S. Provisional Patent Application No. 61/784,847 filed on Mar. 14, 2013, which is incorporated herein by reference in its entirety.

BACKGROUND

Field of the Disclosure

The present disclosure relates generally to grounding spacers for making electrical connection between metal pieces that are mechanically joined together.

Related Art

Solar panels are becoming an increasingly popular energy alternative. Solar panel frames, and the mounting rails to which they are fastened, can be made of aluminum. However, the solar panel frames normally have anodized surface treatment, which insulates the surface from electrical continuity. As a result, the solar panels are not electrically grounded to the mounting rail. There exists a need in the art for a grounding spacer to provide electrical communication between two such mechanical structures that is easy and simple to manufacture.

SUMMARY

The present disclosure relates to a grounding spacer. More specifically, the present disclosure relates to a single sheet construction of a grounding spacer having a plurality of penetration features radially spaced about the spacer. The penetration features could alternatingly extend in opposite directions, or the penetration features could each have portions thereof that extend in opposite directions.

BRIEF DESCRIPTION OF THE DRAWINGS

The foregoing features of the disclosure will be apparent from the following Detailed Description, taken in connection with the accompanying drawings, in which:

FIG. 3 is a perspective view of a grounding spacer with round penetration features;

FIG. 4 is a top view of the grounding spacer of FIG. 3;

FIG. 5 is a cross-sectional side view of FIG. 4;

DETAILED DESCRIPTION

The present disclosure relates to a grounding spacer, as discussed in detail below in connection with FIGS. 1-14.

Figure 1:
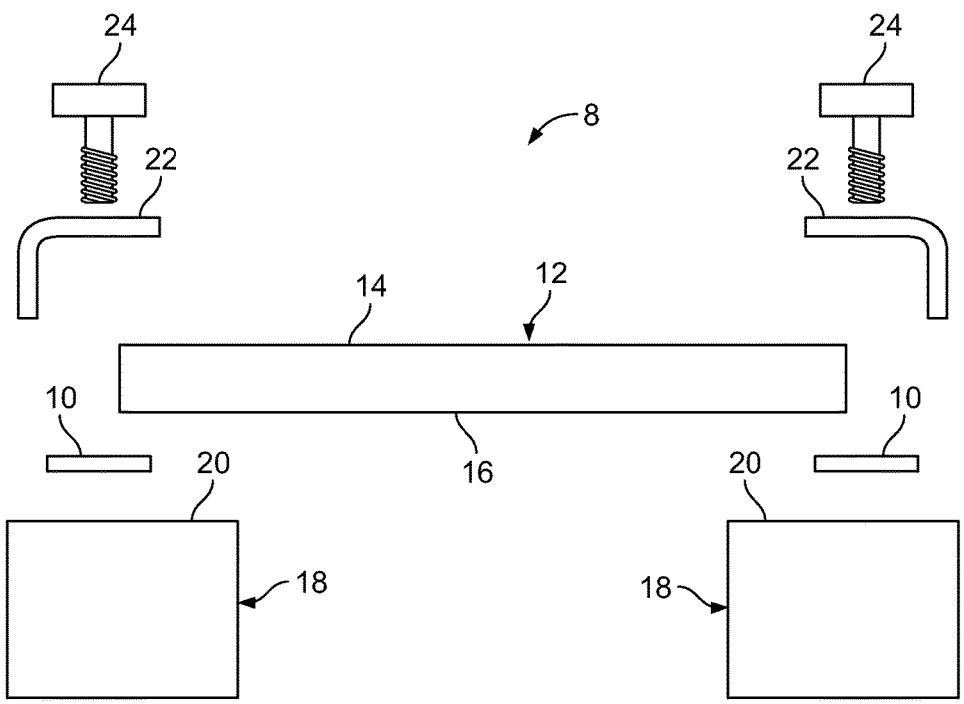
FIG. 1 is an exploded view of a solar panel assembly utilizing grounding spacers of the present disclosure.

FIG. 1 is an exploded view of a solar panel assembly 8 utilizing grounding spacers (washers) 10 of the present disclosure. As shown, the assembly 8 includes grounding spacers 10, a solar panel 12 having a top surface 14 and a bottom surface 16, mounting rails (guard rails) 18 having a top surface 20, panel clamps 22, and bolts 24. The solar panel 12 could have an extruded aluminum frame, such as frames with a T6 surface hardness. The grounding spacer 10 could be made of 300 series stainless steel with a temper, for example, of ½ hardness. However, the material and hardness of the grounding spacer 10 could vary depending on such factors as the material and hardness of the solar panel frame and mounting rails 18. The grounding spacer 10 can be manufactured from a single sheet of metal. It is noted that although the grounding spacers 10 are used in a solar panel assembly 8, the spacers 10 could be used in any variety of applications, where mechanical and electrical contact between two materials is desired.

Figure 2:
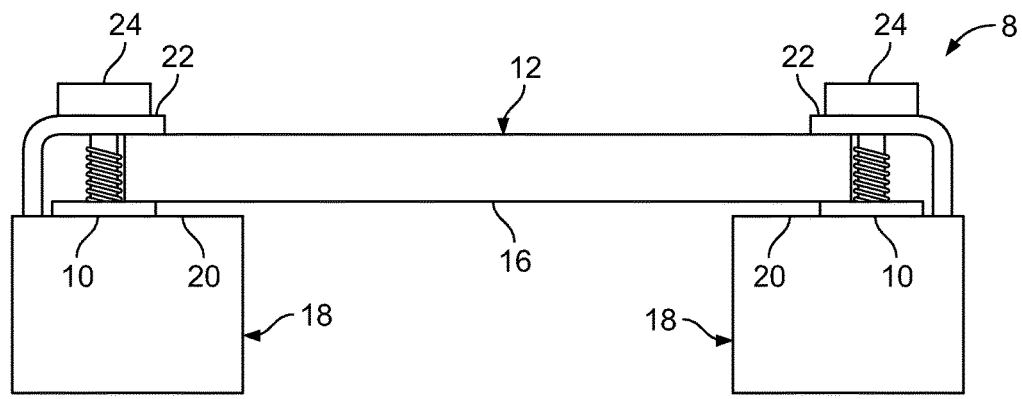
FIG. 2 is an assembled view of the solar panel assembly of FIG. 1.

FIG. 2 is an assembled view of the solar panel assembly 8 of FIG. 1. As shown, each grounding spacer 10 is in direct contact with the bottom surface 16 of the solar panel 12 and the top surface 20 of the mounting rail 20. When the bolts 24 are tightened, the clamps 22 will push down on the solar panel 12, and the penetration features of the grounding spacers 10 (discussed in more detail below) will penetrate (e.g., dig into) the aluminum frame of the solar panel 12 and the aluminum mounting rail 18, piercing the anodized surfaces, thereby providing grounding contact between the solar panel 12 and the mounting rails 18.

FIGS. 3-7 are views of grounding spacers with round penetration features. More specifically, FIG. 3 is a perspective front view of a grounding spacer 110 with round penetration features 162, 164. FIG. 4 is a top view of the grounding spacer 110 of FIG. 3, and FIG. 5 is a cross-sectional side view of the grounding spacer 110 of FIG. 3 taken along line A-A of FIG. 4. As shown, the spacer 110 may have a top surface 134, a bottom surface 136, a central aperture 132 (e.g., bolt hole), and an outer diameter 130. Top extending (upstanding) penetration features 162 and bottom extending (downstanding) penetration features 164 alternate around the spacer. It is noted that eight penetration features 162, 164 are shown, but any number of penetration features 162, 164 could be used. The penetration features 162, 164 could be formed by stamping sheet metal. More specifically, a stamping process could be used such that sheet metal is first stamped to remove material, thereby forming the outer diameter 130, the central aperture 132, and radial apertures positioned around the central aperture 132. Then the metal around each of the radial apertures could be pushed (or stamped) to form top extending penetration features 162, and then pushed (or stamped) a second time to form bottom extending penetration features 164.

Figure 6:
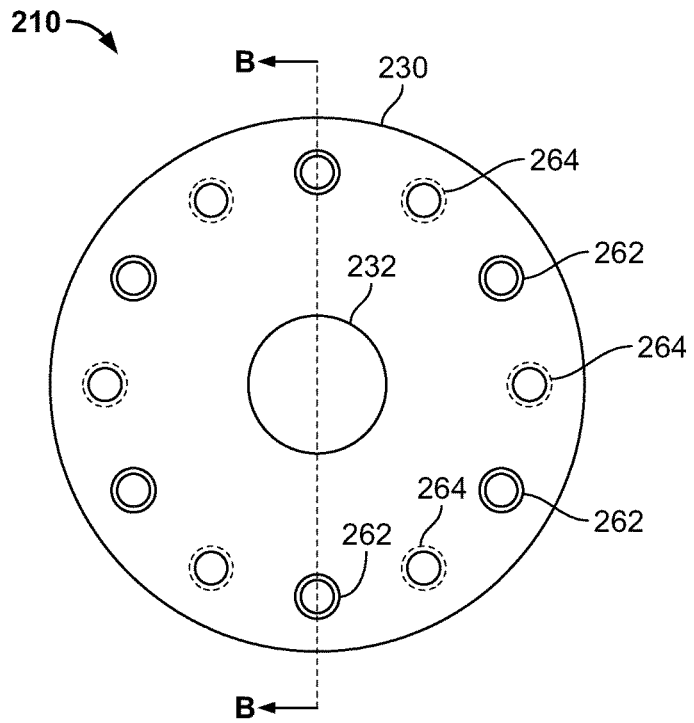
FIG. 6 is a top view of another embodiment of a grounding spacer with round penetration features.
Figure 7:
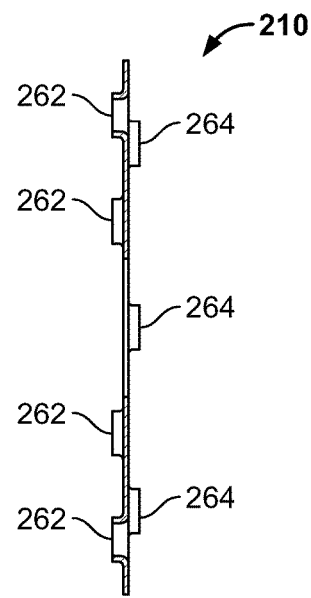
FIG. 7 is a cross-sectional side view of the grounding spacer of FIG. 6.

FIGS. 6-7 are views of another embodiment of the grounding spacer. More specifically, FIG. 6 is a top view of a grounding spacer 210 with round holes, and FIG. 7 is a cross-sectional side view of the grounding spacer taken along line B-B of FIG. 6. As shown, compared to the previous embodiment shown in FIGS. 3-5, the central aperture 232 is smaller in comparison to the outer diameter 230 of the spacer 210. Also, the penetration features 264, 262 are still round but have smaller individual diameters and are radially spaced farther away from the central aperture 232.

Figure 8:
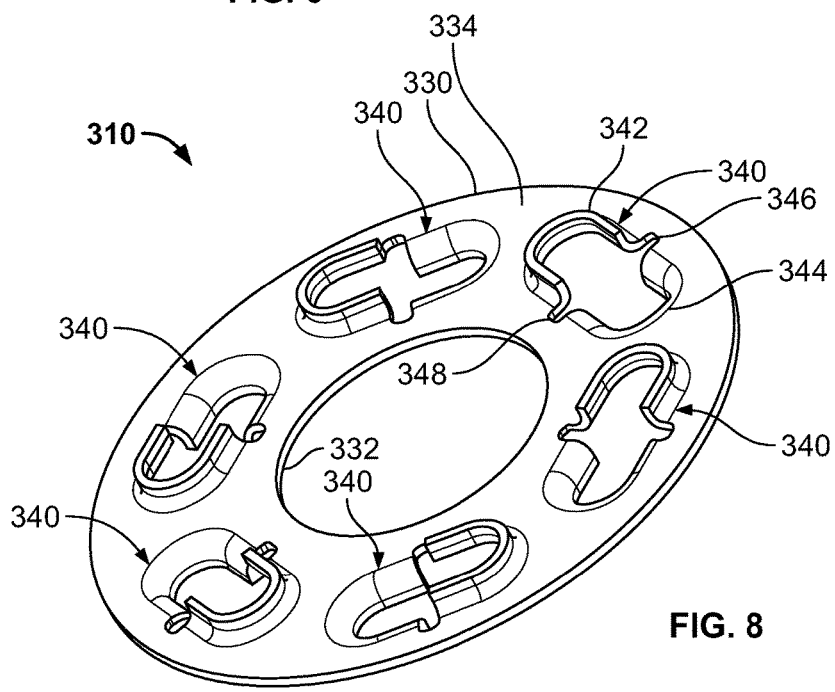
FIG. 8 is a perspective view of a grounding spacer with elongate penetration features.

FIG. 8-12 are various views of a grounding spacer with elongate penetration features. More specifically, FIG. 8 is a perspective view of a grounding spacer 310 with elongate penetration features 340. The spacer 310 includes a top surface 334, a bottom surface 336, an outer diameter 330, and a central aperture 332. The spacer 310 is shown as circular but could be of any size, thickness, and/or shape. The spacer 310 may or may not include a central aperture 332 or a slot or other structure to accommodate a bolt. The spacer 310 includes a plurality of penetration features 340. Although six are shown, any number of penetration features 340 could be used (e.g., four, six, eight, etc.). Each penetration feature 340 includes an oblong hole partially defined by a top extending rim 342 and a bottom extending rim 344. Separating the two rims 342, 344, and partially defining the oblong hole, is an outer arc 346 positioned toward the outer perimeter of the spacer 310, and an inner arc 348 positioned toward the central aperture 332, which are discussed in more detail below. The top extending rim 342 and bottom extending rim 344 extend in opposite directions, and are shown as being generally u-shaped. It is noted that although an elongate penetration feature is shown, any shape could be used.

Figure 9:
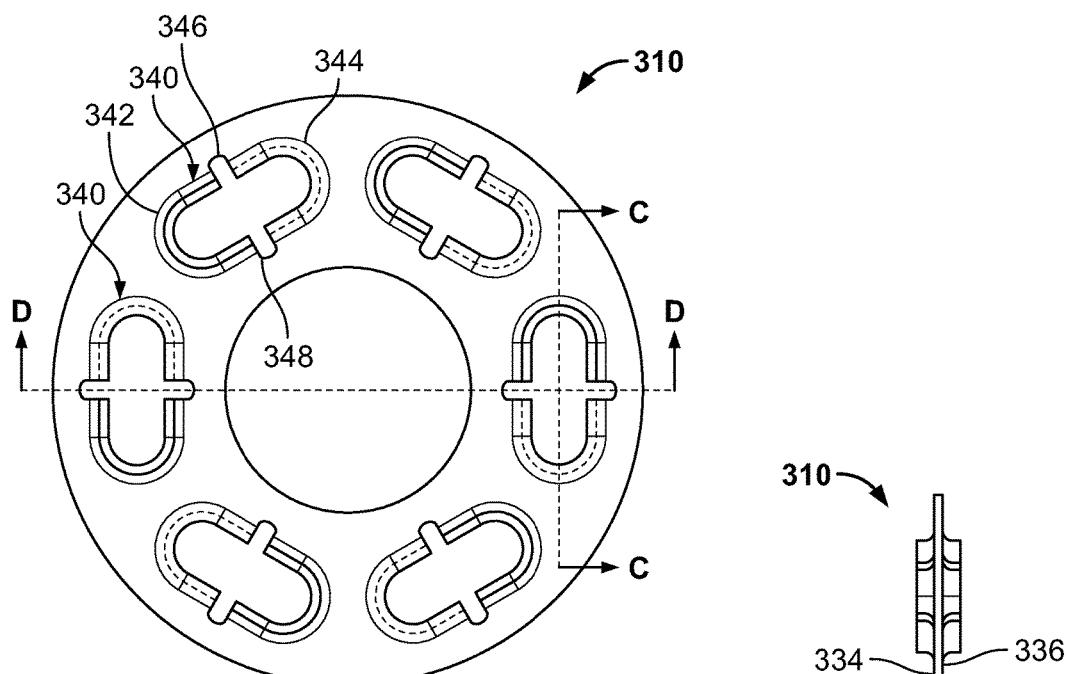
FIG. 9 is a top view of the grounding spacer of FIG. 8.
Figure 10:
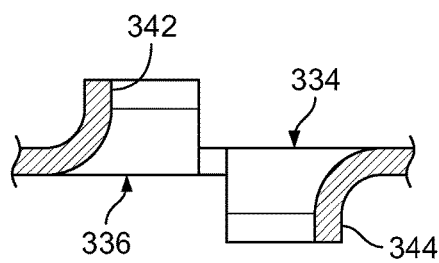
FIG. 10 is a cross-sectional side view of an elongate penetration feature of FIG. 9.
Figure 11:
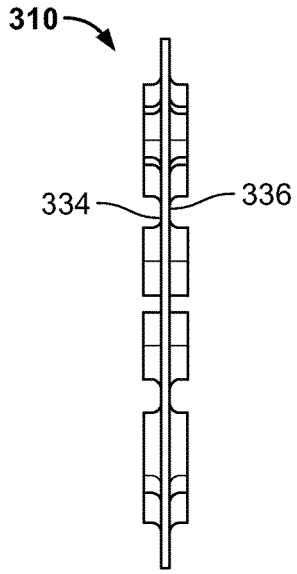
FIG. 11 is a side view of the grounding spacer of FIG. 8.
Figure 12:
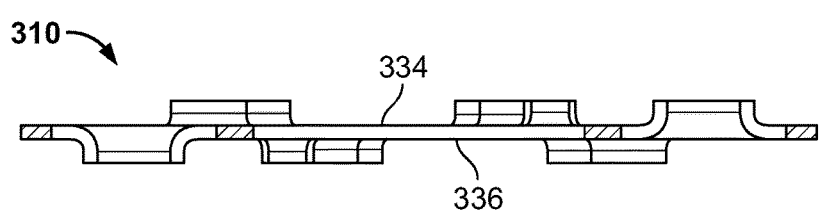
FIG. 12 is a cross-sectional side view of the grounding spacer of FIG. 9.

FIG. 9 is a top view of the grounding spacer 310 with elongate penetration features of FIG. 8, and FIG. 10 is a cross-sectional side view of an elongate penetration feature 340 taken along line C-C of FIG. 9. FIG. 10 shows the top rim 342 extending from a top surface 334, and a bottom rim 344 extending from a bottom surface 336. FIG. 11 is a side view of the grounding spacer 310 of FIG. 8, and FIG. 12 is a cross-sectional view of the grounding spacer 310 taken along line D-D of FIG. 9.

Figure 13:
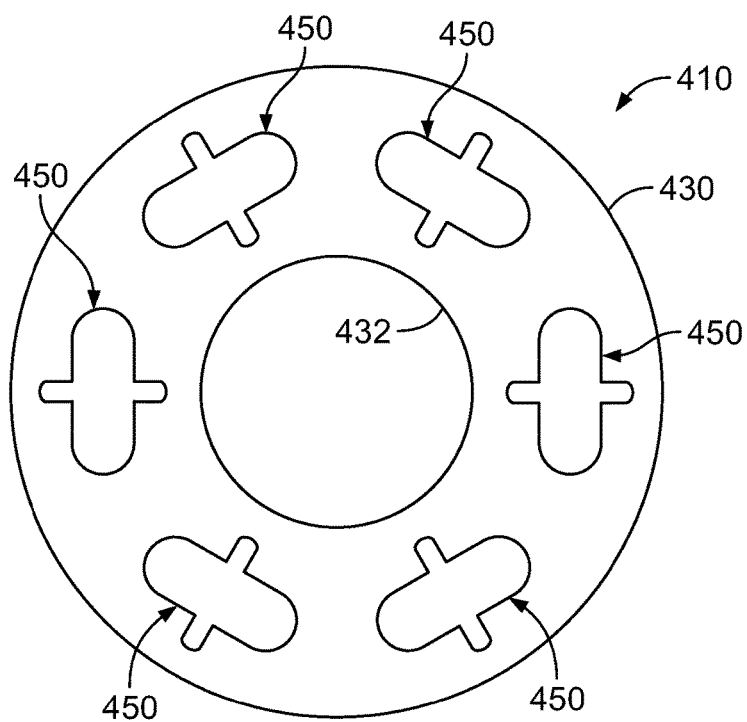
FIG. 13 is a top view of a flat blank grounding spacer with elongate holes.
Figure 14:
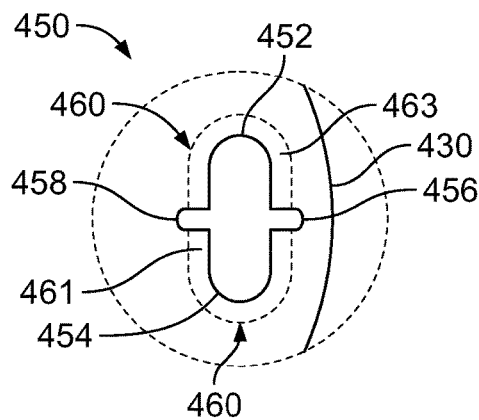
FIG. 14 is an enlarged view of an elongate hole of the grounding spacer of FIG. 13.

FIGS. 13-14 are views of a flat blank grounding spacer with elongate holes. More specifically, FIG. 13 is a top view of a flat blank grounding spacer 410 with elongate holes 450. The flat blank grounding spacer 410 could be formed from a flat piece of sheet metal, and does not have any raised surfaces. A piece of sheet metal could be cut (e.g., stamped) into a desired shape (e.g., circular) with a desired number of elongate holes 450 radially spaced. As shown, the sheet metal could be cut, such as by stamping, into a circular shape having an outer diameter 430 and a central aperture 432. This is an intermediate step in manufacturing the grounding spacer, prior to creating the raised rims that provide the penetration features of the grounding spacer.

FIG. 14 is an enlarged view of an elongate hole of the flat blank grounding spacer 410 of FIG. 13. The elongate hole includes a first arc 452, a second arc 454 opposite thereto, and an inner arc 458 and an outer arc 456 separating the first and second arcs 452, 454. A first portion 463 is defined by the first arc 452 and the bend line 460, and a second portion 461 is defined by the second arc 454 and the bend line 460. The first portion 463 and second portions 461 could be formed into rims (such as shown in FIGS. 8-12) by bending or pushing (e.g., stamping) the first portion 463 up, and the second portion 461 down, such as along the bend line 460. The inner and outer arcs 456, 458 facilitate the manufacture of the penetration features and also relieve stress placed on the penetration features when assembled.

Having thus described the disclosure in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure. What is desired to be protected is set forth in the following claims.

What is claimed is:

1. A method of manufacturing a grounding spacer comprising:
    first stamping a flat piece of sheet metal to form a flat blank grounding spacer having a circular shape, a central aperture, and a plurality of elliptical apertures including first and second arcs;
    second stamping the flat blank grounding spacer to form a plurality of upstanding rims about at least some of the plurality of apertures in a first direction; and
    third stamping the blank to form depending rims about at least some of the plurality of apertures in a second direction,
    wherein the second and third stampings form an upstanding rim portion and a depending rim portion along each of the plurality of apertures, and wherein the upstanding and depending rim portions are separated.

2. The method of claim 1, wherein the plurality of apertures of the flat blank grounding spacer are elongate.

3. The method of claim 1, wherein the second and third stampings form rims alternatingly extending in opposite directions.

4. The method of claim 1, wherein the upstanding and depending rim portions are side by side around an aperture.

5. The method of claim 1, wherein the upstanding and depending rim portions are separated by an inner and outer arcs.

6. The method of claim 1, wherein the plurality of apertures are positioned around the central aperture.

7. The method of claim 1, wherein the plurality of apertures are peripherally positioned around the central aperture.

8. The method of claim 1, wherein the plurality of apertures are concentrically positioned about the central aperture.

9. The method of claim 1, wherein the grounding spacer comprises a grounding washer.

* * * * *